(12) United States Patent
Garrard

(10) Patent No.: US 9,053,130 B2
(45) Date of Patent: Jun. 9, 2015

(54) BINARY DATA STORE

(71) Applicant: STEALTH Software IP S.à.r.l., Esch-sur-Alzette (LU)

(72) Inventor: Thomas Garrard, Chesham (GB)

(73) Assignee: STEALTH Software IP S.á.r.l., Esch-sur-Alzette (LU)

( * ) Notice: Subject to any disclaimer, the term of this patent is extended or adjusted under 35 U.S.C. 154(b) by 0 days.

(21) Appl. No.: 13/802,244

(22) Filed: Mar. 13, 2013

(65) Prior Publication Data
US 2013/0262875 A1     Oct. 3, 2013

(30) Foreign Application Priority Data

Apr. 2, 2012   (LU) .......................................... 91968

(51) Int. Cl.
| H04L 29/06 | (2006.01) |
| G06F 17/30 | (2006.01) |
| G06F 21/60 | (2013.01) |
| G06F 21/62 | (2013.01) |
| H04L 9/08  | (2006.01) |
| H04L 9/14  | (2006.01) |

(52) U.S. Cl.
CPC .......... *G06F 17/30289* (2013.01); *G06F 21/60* (2013.01); *G06F 21/6218* (2013.01); *H04L 9/08* (2013.01); *H04L 9/0897* (2013.01); *H04L 9/14* (2013.01); *H04L 2209/60* (2013.01); *G06F 17/30318* (2013.01)

(58) Field of Classification Search
CPC ......... H04L 9/00; H04L 9/0897; G06F 21/00; G06F 21/60; G06F 21/6218; G06F 17/30289; H04W 12/00
See application file for complete search history.

(56) References Cited

U.S. PATENT DOCUMENTS

| 6,374,336 | B1 | 4/2002 | Peters |
| 7,519,179 | B2 * | 4/2009 | Shiina ............................. 380/44 |
| 7,634,511 | B1 * | 12/2009 | Freiheit et al. ........................ 1/1 |
| 2007/0168292 | A1 * | 7/2007 | Jogand-Coulomb et al. ... 705/52 |
| 2008/0285754 | A1 | 11/2008 | Kezmann |
| 2010/0251345 | A1 * | 9/2010 | James et al. ...................... 726/5 |

FOREIGN PATENT DOCUMENTS

| EP | 1 288 796 A2 | 3/2003 |
| WO | 2004/046899 A2 | 6/2004 |
| WO | 2011/109865 A1 | 9/2011 |

OTHER PUBLICATIONS

European Search Report dated Apr. 26, 2013, in European Patent Application No. 13 16 0917.4, filed Mar. 25, 2013, 8 pages.
Luxembourg Search Report completed Nov. 21, 2012, in Luxembourg Patent Application No. 91968, filed Apr. 2, 2012, 2 pages.
Luxembourg Written Opinion dated completed Nov. 21, 2012, in Luxembourg Patent Application No. 91968, filed Apr. 2, 2012, 4 pages.

* cited by examiner

*Primary Examiner* — Chau Le
*Assistant Examiner* — Muhammad Chaudhry
(74) *Attorney, Agent, or Firm* — Christensen O'Connor Johnson Kindness PLLC

(57) ABSTRACT

A method for storing binary data, preferably in the form of Binary Large Objects (BLOBs), in more than one location. The method includes the steps of producing a processing thread corresponding to each location where the data is to be stored and verifying whether each thread has completed successfully after a predetermined time period. Information relating to the storage of the binary data is stored in an access token.

13 Claims, 5 Drawing Sheets

BINARY DATA STORE

TECHNICAL FIELD

The present application relates to binary data stores for storing Binary Large Objects (BLOBs). In particular, it relates to binary data stores used in collaboration systems that need to provide efficient and accurate access to data that is being manipulated by users of the system.

BACKGROUND

Collaboration systems, such as Microsoft SharePoint™, comprise a collocated collection of applications that are accessible to multiple users through one or more user interfaces, and comprise one or more data stores. Each application or module contributes a distinct set of features to the collaboration system. Such features may include a Web server, a collaborative document repository, a blogging framework, and an authentication server. The user interfaces comprise dedicated client applications and web pages that provide access to the collaboration system. The data stores are used to save data that users create or upload via a network connection and which can be updated or modified by other users.

Most commonly, a data store is provided by a relational database, such as a Structured Query Language (SQL) database. SQL databases are well suited for saving and accessing large numbers of small data items that have inherent structure. Many applications provided by collaboration systems deal with such small structured data items. Examples are intranet applications that comprise HTML data, blog applications, and discussion forums that comprise data featuring information about authorship, date of creation, discussion thread information, and time stamps.

Collaboration systems often comprise document management and repository services that allow users to keep track of different versions of data, such as text processing or spreadsheet documents, over time. Databases can be used to store and handle such unstructured data files as well as the structured metadata that relates to them.

A user does not access the data stores directly, but interacts with the collaboration system. The collaboration system acts as a gatekeeper and enforces a set of rules on each user request before eventually proceeding to retrieve or update the requested information in the data store. The client application is then notified accordingly. By enforcing a set of rules on each transaction request, the collaboration system can make sure that every user is given access to the latest version of any data item in the data stores. Collaboration systems generally provide options for data backup, although more commonly in large organizations this process is handled by third-party tools. In known collaboration systems, the data stores themselves are generally kept on site with the server or servers that implement the collaboration system. A backup is normally performed periodically as a scheduled task and the backup data is stored separately as per user requirements.

Different kinds of data nowadays tend to merge into complex files that have a large volume and lack easily accessible structure. Typical examples of such files include images or other media files such as encoded audio or video signals. Audio-visual content is generally encoded in order to reduce its size, resulting in a stream of binary digits that is as such not readable or usable. The data can only be interpreted for viewing or listening once a decoding step has been performed on the binary data. Binary files of that type are typically known as Binary Large OBjects or BLOBs. However a BLOB may refer to any unstructured binary data, including text documents, spreadsheets, or any data that would generally be considered a file on a computing system.

In collaboration systems, or generally in document repository systems, the inclusion of BLOBs can pose problems to the efficiency of the system. While the underlying SQL data stores are efficient for storing and accessing large numbers of structured data items, they are not efficient for storing and accessing unstructured data items, such as BLOBs. However, as collaboration systems are being used for the sharing and collaboratively working on unstructured data files, BLOB data can rapidly represent over 90% of a collaboration systems data store volume. This incurs poor performance when retrieving stored data and may cause prolonged outages of the system when the data stores are being backed up by the system.

It has been proposed to offload BLOB storage to different, unstructured data stores such as disk file systems that can handle large data files. Such storage can be provided on site using a dedicated storage device, or even at a physically remote storage site. While the metadata related to a BLOB remains stored in an SQL database, the BLOB itself is stored in a remote store. The metadata comprises an access token and a unique identifier for the BLOB. Using the access token, the BLOB can be retrieved and accessed. While such a solution can improve the overall performance of an SQL store in a collaboration system, the system may still encounter prolonged outage times when the large remote data stores are being backed up by the system.

As with any kind of data stored by a collaboration system to which several users may have access, it is important to provide effective and secure access control to BLOB data. One possibility is to encrypt stored BLOB data, and to make sure that it is improbable for unauthorized users to access or decipher an encrypted BLOB.

Collaboration systems such as Microsoft SharePoint™ generally do not natively support inline encryption of data, including remotely stored BLOB data. However, there is often an interface that allows the externalisation of BLOB data. In Sharepoint, such an interface is implemented by External BLOB Storage (EBS) and Remote BLOB Storage (RBS). During the process of such externalisation it is possible to encrypt the data. This may be achieved using a block cipher such as the AES 256 algorithm. In such a case the encryption key is stored on the local server in a key store. The encrypted BLOB is stored in the remote BLOB store. A third element that is used for encoding and deciphering the BLOB may be provided by an Initialization Vector (IV). Initialization Vectors are commonly used with block ciphers. A block of data that is to be encoded is first randomized through multiplication by the IV. The randomized block is then encrypted using the block cipher. This process makes sure that two identical blocks of data will not be encoded to the same encrypted bit sequence by the block cipher, as they will have been randomized by two different IVs.

In known collaboration systems and in general use of block ciphers, the IV is stored together with the encrypted data as part of the encrypted data, for example, in the remote BLOB store. A sufficiently privileged user or administrator, or a hacker maliciously gaining the privileges of such a user, can therefore access an unencrypted form of the binary data by gaining access to the key store and to the BLOB store.

The present application describes methods and systems that alleviate at least some of the problems in relation with the secure storage of Binary Large Objects in collaboration systems.

SUMMARY

According to a first aspect, there is provided a method for storing binary data in at least two data stores. The method comprises the steps of:

at a storage interface, receiving, from a collaboration system, a store request and binary data that is to be stored;

at a storage interface, creating a processing thread for each available data store, and configuring each processing thread for writing said binary data to one of said data stores;

at a storage interface, checking for successful termination of said processing threads after a timeout delay;

at a storage interface, for each thread that has not successfully terminated after said timeout delay, creating an entry in a Control Log; and at a storage interface, creating an access token for said binary data, and sending said access token to said collaboration system.

In such embodiments that concern backing up said binary data, the binary data written to each binary store comprises a complete copy of the binary data to be stored so that each binary store stores a complete, independent copy of the binary data.

Preferably, the timeout delay for processing threads may be computed as a factor of the running time of the first successfully terminating thread.

The Control Log may further be a database that may be stored on the storage interface.

The method may further advantageously comprise the step of computing a hash value for the binary data. The hash value may be included in the access token.

Preferably, a Control Log entry may comprise information on a data store on which the binary data was not successfully written.

More preferably, the method may comprise the steps of:

creating a processing thread for each Control Log entry that indicates an unsuccessful storage operation of said binary data to a data store;

configuring each created processing thread for storing (i.e., writing) said binary data in one of said data stores; and in case one of said processing threads succeeds in storing said binary data in said data store, updating the corresponding Control Log entry by providing the new storage location relative to said binary data.

According to a second aspect, there is provided a method for reading binary data that is stored in at least two data stores, the method comprising the steps of:

at a storage interface, receiving, from a collaboration system, a read request and an access token for encrypted binary data that is to be read;

at a storage interface, locating said binary data in at least one data store using information from said access token or a Control Log; and retrieving said binary data from said data store and returning it to said requesting collaboration system.

The binary data that is stored in at least two data stores may comprise a backup of binary data on each store. In this case, the binary data in each store is a backup of the same binary data.

Preferably, the method may further comprise the step of computing a hash value for said located binary data.

More preferably, the access token may comprise the hash value for said binary data, and the method may further comprise the step of:

checking whether the hash value for the located binary data is equal to the hash value comprised in the access token, and returning the binary data to said collaboration system conditionally on the equality of the two hash values.

It is preferred that the access token may comprise information on the storage location of the stored data.

According to a third aspect, there is provided a method for encrypting and storing binary data to at least one data store, the method comprising the steps of:

at a storage interface, receiving, from a collaboration system, a store request and binary data that is to be stored;

at a storage interface, providing a first encryption key;

at a storage interface, generating a second encryption key;

at a storage interface, encrypting said binary data using said first and second encryption keys and an encryption algorithm;

at a storage interface, storing (i.e., writing) said encrypted binary data in the at least one data store; and at a storage interface, creating an access token to said stored binary data, including said second encryption key and returning it to said collaboration system, wherein either or both of said first encryption key and said second encryption key are stored remote from said encrypted binary data. The first encryption key may be stored remote from the second encryption key.

The binary data that is to be stored may be a backup.

Preferably, the method may further comprise the step of computing a hash value for said binary data and said access token may comprise the hash value.

According to a further aspect, there is provided a method for decrypting and reading binary data that is stored in at least one data store, the method comprising the steps of:

at a storage interface, receiving, from a collaboration system, a read request and an access token for encrypted binary data that is to be read;

at a storage interface, providing a first encryption key;

at a storage interface, providing a second encryption key;

at a storage interface, locating said binary data in the at least one data store and storing it in a buffer memory;

at a storage interface, decrypting said binary data using said first and second encryption keys and a decryption algorithm; and at a storage interface, returning said decrypted binary data to said requesting collaboration system, wherein either or both of said first encryption key and said second encryption key are stored remote from said encrypted binary data.

The binary data that is stored on at least one data store may be a backup.

Preferably, the method may further comprise the step of computing a hash value for said located binary data.

The access token may preferably comprise the hash value for said binary data, and the method may further comprise the step of:

checking whether the hash value for the located binary data is equal to the hash value comprised in the access token, and decrypting the binary data conditionally on the equality of the two hash values.

Further, the first encryption key may be provided by said collaboration system.

Preferably, the encryption algorithm may be a block cipher and the second encryption key may be an Initialization Vector that is generated by the storage interface and used to randomize the binary data prior to encryption.

More preferably, the access token may comprise the Initialization Vector.

The collaboration system may preferably be a Microsoft SharePoint™ collaboration system.

Even more preferably, the binary data may be a Binary Large Object (BLOB).

Embodiments described herein allow BLOB data to be efficiently stored in and retrieved from several physically collocated or remote storage platforms.

DESCRIPTION OF THE DRAWINGS

Embodiments of the present disclosure are described with reference to the accompanying schematic diagrams where.

DETAILED DESCRIPTION

Embodiments of the invention are described hereafter with reference to the accompanying diagrams. The diagrams themselves do not limit the scope of the present invention. Similar reference numbers in diagrams depicting different embodiments of the present invention are used to denote similar concepts that are present throughout the different embodiments.

Storage Interface

Figure 1:
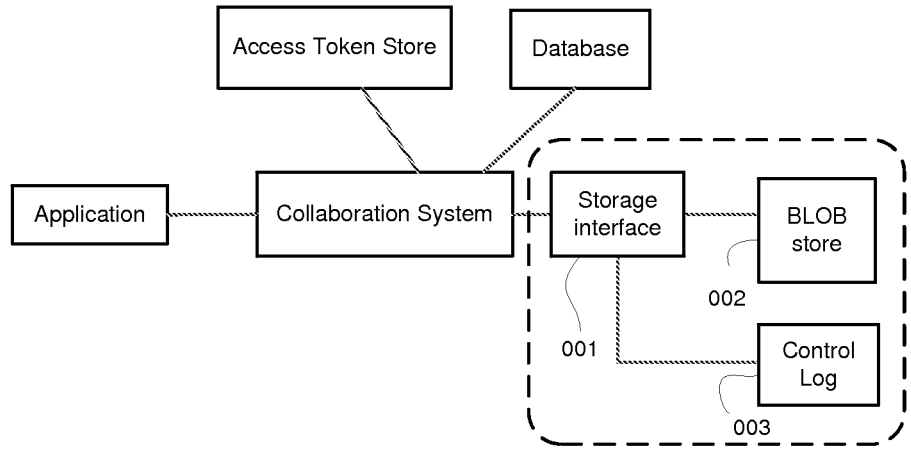
FIG. 1 is a schematic illustration of an embodiment of the present invention.
Figure 2:
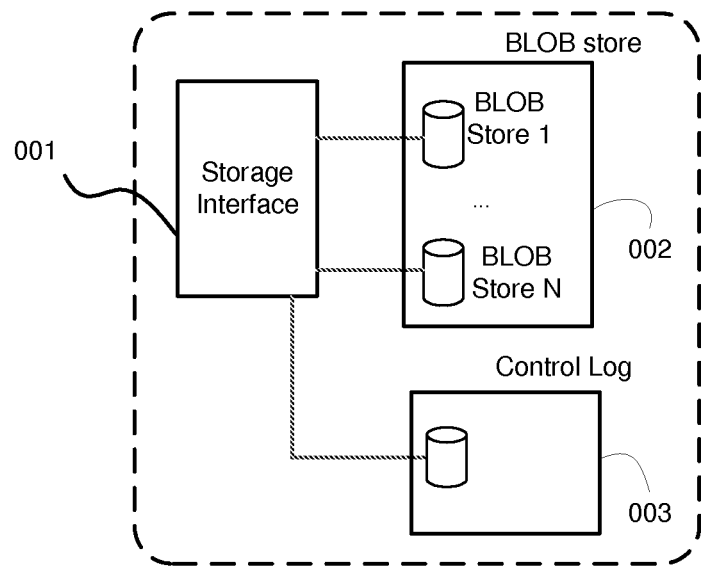
FIG. 2 is a schematic illustration of an embodiment of the present invention.

In a first embodiment according to the present invention, as depicted in FIGS. 1 and 2, there is provided a storage interface 001 for a collaboration system. The storage interface is configured to receive a store request from the collaboration system, and receive BLOB data that is to be stored. The storage interface is further configured for buffering the BLOB into a memory buffer, and for writing the BLOB to at least two storage platforms or BLOB stores 002. The storage platforms can be a dedicated storage device such as a Hard Disk Drive, a Solid State Drive, a redundant array of independent disks (RAID) storage server, a Content Platform, a Cloud service, any other storage platform, or a combination thereof. The respective I/O interfaces for writing, reading, and networking are provided. A Control Log 003 is used to keep track of storage operations that are performed on the BLOB stores 002.

Figure 3:
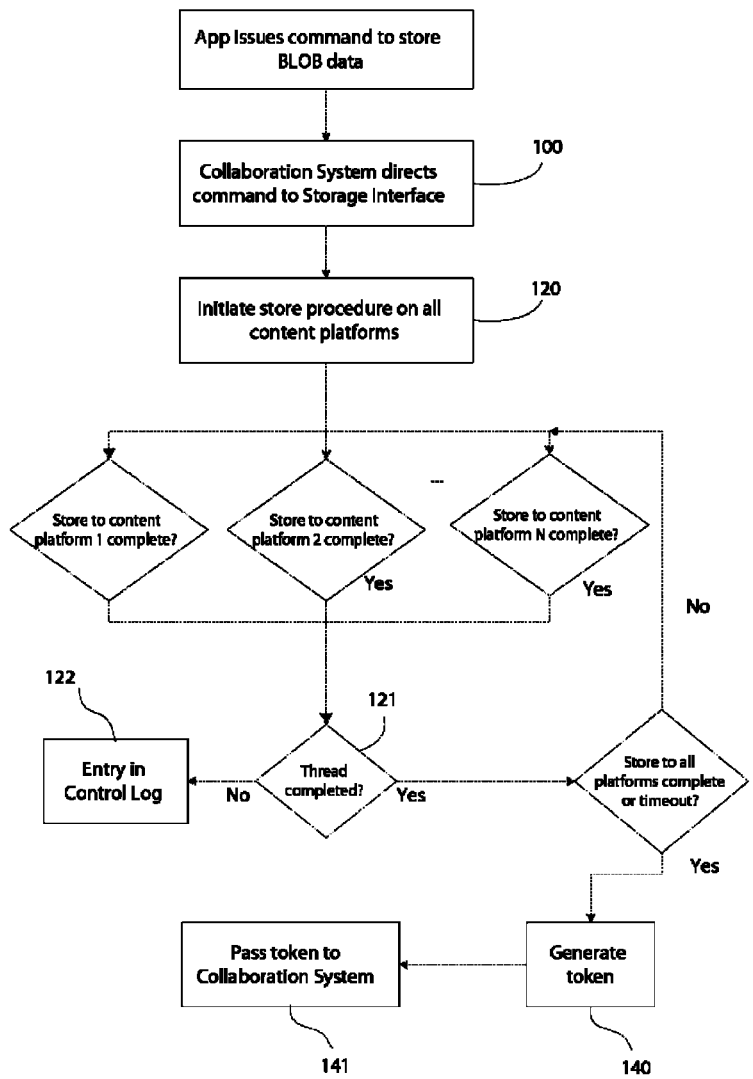
FIG. 3 is a flow diagram illustrating steps according to an embodiment of the present invention.

The method steps are further illustrated in FIG. 3. Upon reception of the store request 100, the storage interface creates one processing thread 120 for each available storage platform. Each processing thread is configured to write the BLOB data to a respective storage platform. Each thread uses an appropriate protocol for writing to the respective storage platform. Storage platforms include, but are not limited to, Microsoft Azure™, Hitachi HCP™, Dell DX™, NAS, and Amazon S3™. Configuration data is used to define the available storage types and the protocols (e.g., Common Internet File System (CIFS) or any proprietary protocol) to be used to access the data stores. The configuration data is advantageously stored as a file or in some other way such as a database or system registry entry.

If the storage operation is successful, the processing thread returns a signal to the storage interface indicating that it has terminated successfully. If the storage operation fails, no such signal is sent. After a timeout delay, the storage interface checks 121 whether all the threads that have been created have terminated successfully. The timeout delay is specified in the configuration data. In a preferred embodiment, the timeout delay is set to a multiple of the running time of the first successfully returning storage thread. If two stores are defined and a timeout of 1.5 specified, the timeout mechanism operates as follows. Two threads are started for storing the BLOB to their respective data stores. A first thread returns a success after 100 ms. The storage interface will wait a further 50 ms for the second thread to return.

In a different embodiment, the timeout may not be preconfigured, but may instead be dependent on network conditions and other user-dependent parameters, such as a tendency of a particular storage platform to fail. The storage interface computes the timeout using the above parameters in order to balance user experience (lower timeouts) and varying storage latency (higher timeouts).

As stated above, the storage interface can be configured using a file:

```
<?xml version="1.0" encoding="utf-8"?>
<StealthConfig>
 <Servers>
  <Server>
   <Host>\\sv098598.hcptest.stealth-soft.com\data</Host>
   <Port>80</Port>
  </Server>
 </Servers>
 <Retention>
  <MinRetention>0</MinRetention>
  <MaxRetention>0</MaxRetention>
 </Retention>
 <GarbageCollectionDB>
  <TableName></TableName>
  <Server></Server>
  <Database>STEALTHDB</Database>
  <TrustedConnection>Yes</TrustedConnection>
 </GarbageCollectionDB>
 <Encryption>
  <EncryptionOn>False</EncryptionOn>
  <AES256Key></AES256Key>
 </Encryption>
 <ProviderSettings>
  <BackEndType>CIFS</BackEndType>
  <Active>True</Active>
  <DebugOutput>True</DebugOutput>
  <DebugLevel>5</DebugLevel>
  <LogFileName>SSLog.txt</LogFileName>
 </ProviderSettings>
</StealthConfig>
```

The storage interface creates an access token 140 for the stored BLOB data if at least one storage thread returns successfully. The access token comprises information relating to the storage platforms to which the BLOB data has been successfully written, such as the path to the location where the BLOB may be retrieved later on. In a preferred embodiment, it also includes information relating to the storage platforms to which the BLOB data has not been successfully written. The access token is sent to the requesting collaboration system 141 and is to be used as a reference to the stored BLOB.

An example of an access token implemented in XML is given below:

```
<?xml version=\"1.0\"?>
<Token>
 <Path>\\TestNAS1\\Scratchpad\\19Dec12\\7557610f-9419-4762-9f0c-a779d13807d1</Path>
 <IV>65FF572E164F532F5A9E31B2D1C167E0</IV>
 <MD5>B8BC66B3FD2156A3C22FEF11B2F87A61</MD5>
</Token>
```

-continued

```
<?xml version=\"1.0\"?>
<Token>
    <Path>\\TestNAS2\\Scratchpad\\19Dec12\\9dba82ee-6070-4eac-a10f-
fb8871897900</Path>
    <IV>65FF572E164F532F5A9E31B2D1C167E0</IV>
    <MD5>B8BC66B3FD2156A3C22FEF11B2F87A61</MD5>
</Token>
```

The above access token provides the storage location of a BLOB on two different platforms: TestNAS1 and TestNAS2. These locations are provided using the <Path> markup. Moreover the access token comprises an Initialization Vector, provided using the <IV> markup, for encryption purposes, and a hash value representing the stored content. The hash value is provided using the <MD5> markup. These access token entries are preferably generated even if the BLOB was not successfully written to one of the considered platforms during the timeout interval. In such a case, the path relative to that platform, which is comprised in the access token, is a tentative path. The storage interface expects that it will be able to store the BLOB to this tentative location once it tries to store the BLOB to that particular platform once again.

For each thread that has not terminated successfully and that has not been able to perform the assigned store operation before expiry of the timeout, a corresponding entry is made 122 in a Control Log. The Control Log may be stored in a database, in a file, or any other event log. If the Control Log is stored as a database, it may be accessed through the same database server which controls access to the collaboration system database.

The Control Log is initially a record of all storage requests that could not be completed within the required timeout period. It allows a thread to be rescheduled by the storage interface in order to try and store the data to the respective platforms in later attempts. The use of the Control Log 122 is explained using three examples here below:

—First Storage on TestNAS1 Fails, Retry Fails:

In the event that the thread that tries to store the BLOB B1 on TestNAS1 does not successfully return within the specified timeout delay, a tentative path for B1 is generated and written to the access token, while the status of the platform is marked as "failed" in the Control Log.

This indicates that the storage interface should try to store the BLOB to TestNAS1 again at a later time. If this attempt fails as well, the status remains "failed." The resulting entries comprise the following information:

Path in access token: "\\TestNAS1\\Scratchpad\\19Dec12\\7557610f-9419-4762-9f0c-a779d13807d1"

Status in Control Log for Platform 1 and BLOB B1: "Failed"

—First Storage on TestNAS1 Fails, Retry Succeeds to Unexpected Path:

In the event that the thread that tries to store the BLOB B1 on TestNAS1 does not successfully return within the specified timeout delay, a tentative path for B1 is generated and written to the access token, while the status of the platform is marked as "failed" in the Control Log.

This indicates that the storage interface should try to store the BLOB to TestNAS1 again at a later time. If this attempt succeeds, the status is recorded as "success." However, the path to which B1 has been stored in the second attempt does not correspond to the tentative path that has been written to the access token. In such a case, the correct path is recorded in the corresponding Control Log entry. The resulting entries comprise the following information:

Path in access token: "\\TestNAS1\\Scratchpad\\19Dec12\\7557610f-9419-4762-9f0c-a779d13807d1"

Status in Control Log for Platform TestNAS1 and Blob B1: "Success"

Path in Control Log for Platform TestNAS1 and BLOB B1: "http://castor/740baec0-406c-495c-a54a-57aab3716f57"

—First Storage on TestNAS1 Fails, Retry Succeeds to Expected Path:

In the event that the thread that tries to store the BLOB B1 on TestNAS1 does not successfully return within the specified timeout delay, a tentative path for B1 is generated and written to the access token, while the status of the platform is marked as "failed" in the Control Log.

This indicates that the storage interface should try to store the BLOB to TestNAS1 again at a later time. If this attempt succeeds, the status is recorded as "success." If the path to which B1 has been stored in the second attempt corresponds to the tentative path that has been written to the access token, no further entry in the Control Log is required. The resulting entries comprise the following information:

Path in access token: "\\TestNASMScratchpad\\19Dec12\\7557610f-9419-4762-9f0c-a779d13807d1"

Status in Control Log for Platform TestNAS1 and BLOB B1: "Success"

The storage interface periodically creates a new thread for each entry in the Control Log in order to retry the write operation that originally failed. If the corresponding thread terminates successfully, the corresponding entry in the Control Log is adapted accordingly. This avoids generating, updating, and sending anew any access tokens to the collaboration system.

Storage errors are handled internally, for most examples, the storage locations are simply retried up to a maximum of three times. There is a limit to three attempts as at that point we can assume that the resource is unavailable. When storing BLOBs, storage errors are treated in the same way as timeouts. If a particular storage platform cannot be written to, an entry will be made in the Control Log in exactly the same way as if a thread had failed to return in time. As long as at least one thread returns successfully (i.e., one successful storage was achieved) there is no need to report an error to the collaboration platform. If however no files can be written, then an error (or exception) will be returned to the collaboration platform in the form expected by the collaboration platform.

The storage interface is further configured to receive a retrieve or read request from the collaboration system, together with an access token relating to a BLOB that is to be retrieved. A retrieval is successful once the storage interface is able to successfully retrieve and verify one copy of the requested BLOB from the available data stores.

The storage interface looks up, among the information included in the access token, on which of the available storage platforms the BLOB has been successfully written. The storage interface locates the BLOB on one of the matching storage platforms and sends the BLOB to the collaboration system. In cases where data was not stored on all platforms at the point of initial storage, the interface will first try storage platforms that were successful; it will then check the entries in the Control Log.

Indeed, if the storage interface has managed to successfully write the BLOB to a BLOB store that initially failed, the corresponding updated path location will be available in the Control Log. The information provided in the Control Log is kept up to date by the storage interface, while the information comprised in the access token is static, and reflects the status of the write operations at the time the access token was created, i.e., after the expiration of the timeout delay triggered by the first successful completion of a writing thread.

The storage interface retrieves the BLOB from one of the available storage locations and returns it to the collaboration system. The collaboration system may then pass the data on to the user application that has requested the data.

The proposed storage interface allows embodiments of the invention to minor the BLOB data to any type of backend storage platform. High data integrity is ensured through the use of the Control Log as it enables the storage interface to verify whether all the storage platforms contain the same version of the BLOB data at a given time.

Embodiments of the invention are therefore particularly well suited for providing backups of the BLOB data.

High data integrity is further ensured by the use of a Write Once Read Many (WORM) storage model which means file updates do not need to be propagated to all stores as there are no file updates. As the minoring operation is performed in a semi-synchronous way, the availability of the overall system remains high. A combination of remote and local storage is possible through the use of a single storage interface.

Encryption

In a second embodiment according to the present invention, there is provided a storage interface for a collaborative system. The storage interface is configured to receive a store request from the collaborative system and receive BLOB data that is to be stored. The storage interface is further configured to encrypt the BLOB data prior to storing it. The encryption cipher uses at least two pieces of special knowledge, which will be called "keys" in what follows, for encrypting the BLOB data. In a preferred embodiment, the first key is static but the second key is generated for each BLOB storage request. For implementation purposes, these keys may be two traditional keys or a key and an Initialization Vector, if an Initialization Vector is used, it is to be considered the second key.

Figure 4:
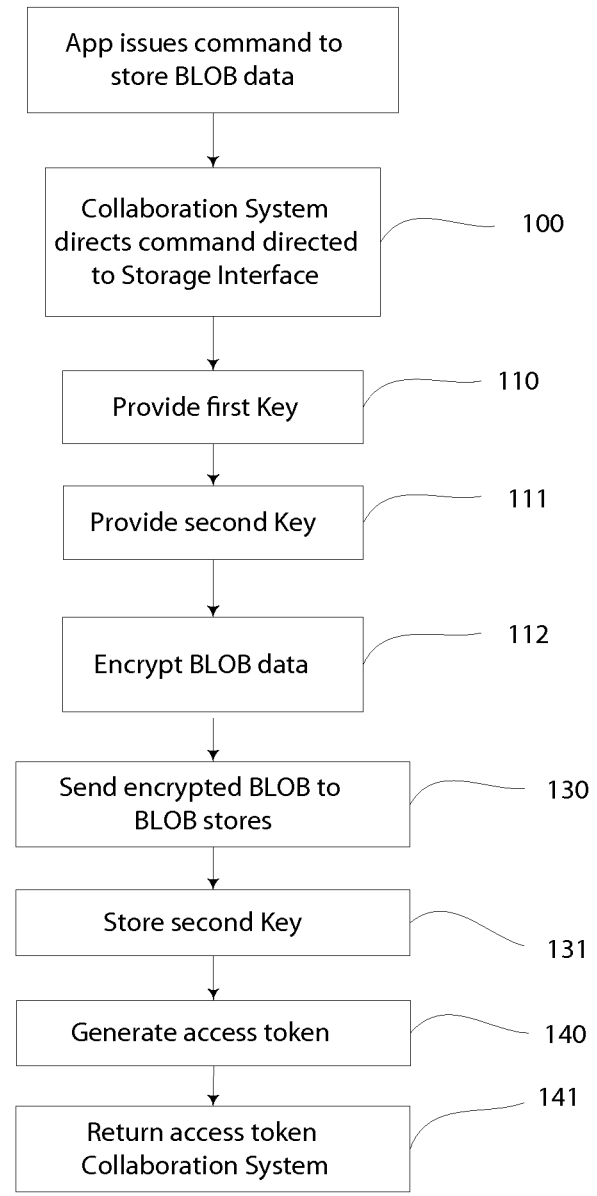
FIG. 4 is a flow diagram illustrating steps according to an embodiment of the present invention.

The method steps that are used are further illustrated in FIG. 4. First, the storage interface receives a store request from the collaboration system 100. The storage interface has access to a first key 110, which is stored in a primary key store. A second key is generated 111 by the storage interface. Using both keys, the storage interface runs a cipher algorithm in order to produce the encrypted BLOB data 112. The encrypted BLOB data is written to at least one BLOB storage platform 130, and an access token is generated 140. The access token comprises information on the storage platforms to which the BLOB has been written. The storage interface returns the access token to the collaboration system 141. The second key is stored in a secondary key store 131, which is distinct from both the BLOB store and from the primary key store. The secondary key store also keeps information about which of the stored keys has been used to encrypt a particular BLOB. The secondary key store may be implemented as a separate database or database table. However, as the access token is normally stored on a separate server to the primary key store, the access token is a preferred location to efficiently store the secondary key.

The storage interface is further configured to receive a retrieve or read request from the collaboration system and receive an access token for the BLOB that is to be read. The storage interface is further configured to decrypt the BLOB data prior to sending it to the collaboration system.

After retrieving the encrypted BLOB from a storage platform using the information that is included in the access token, the storage interface proceeds to deciphering the BLOB. In order to decipher a previously encrypted BLOB, a first encryption key is retrieved from the primary key store. The storage interface is configured to retrieve the second key that has been used to encrypt the BLOB from a secondary key store. Using the first and second encryption keys, the storage interface deciphers the encrypted BLOB and sends the deciphered data to the collaboration system.

In a preferred embodiment, the cipher used by the storage interface is a block cipher, which relies on an encryption key and an Initialization Vector (IV), which is used for randomizing the BLOB data. While the encryption key is kept in a distinct key store, the IV, which implements the second key, is generated by the storage interface prior to encrypting the BLOB. After encrypting the BLOB data successfully, the encrypted data is written to at least one BLOB storage platform. The storage interface sends the IV to an IV store, where the IV is marked as having been used to encrypt the BLOB. In a particular preferred embodiment, the storage interface generates an access token for the encrypted BLOB that includes the used IV. The access token is sent to the collaboration system, which writes it to a store that is distinct from the key store. When the collaboration system issues a read request for the BLOB to the storage interface, it includes the access token for the BLOB that is to be retrieved. The storage interface retrieves the IV, which is necessary to decipher the requested BLOB, from the access token.

The proposed storage interface allows embodiments of the invention to securely store BLOB data to any type of backend storage platform. High data security is ensured through the use of three different locations for storing the primary key, the secondary key and the encrypted data. A malicious user would need to gain access to three different stores in order to be able to get access to the stored binary data.

A preferred embodiment based on the Microsoft SharePoint™ collaboration system will be illustrated in what follows without limiting the scope of the present invention.

A SharePoint system includes, as part of its configuration files, a primary key store in which a primary encryption key is stored. When a client application requests to encrypt and store BLOB data, the SharePoint system directs the request to a storage interface according to a preferred embodiment of the present invention.

Figure 5:
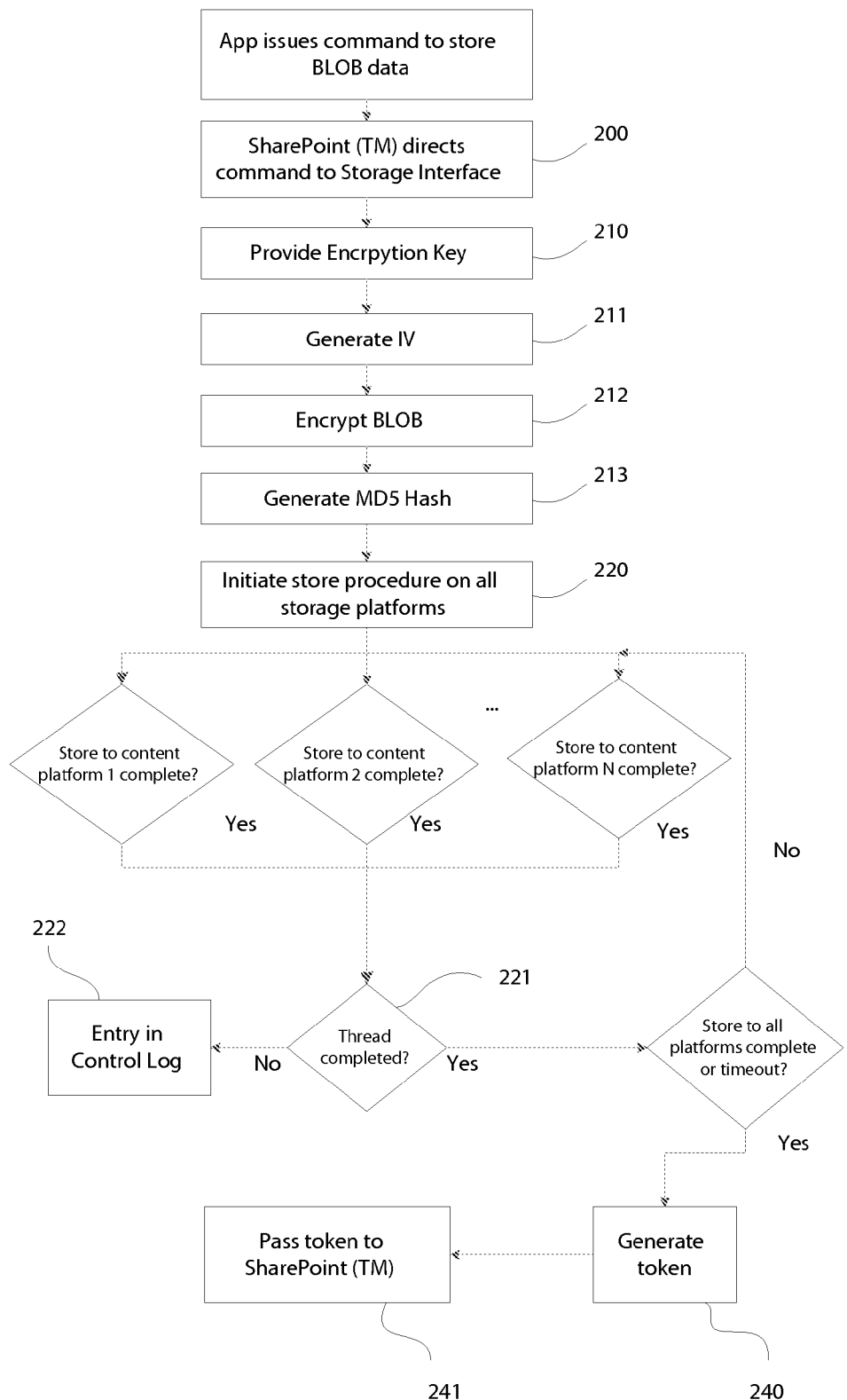
FIG. 5 is a flow diagram illustrating steps according to an embodiment of the present invention.

The storage interface is configured for writing to at least two storage platforms that may be collocated with the storage interface or may be physically remote. The steps that follow are illustrated in FIG. 5. Upon reception of the write request from the SharePoint system 200, the storage interface keeps the BLOB data in a temporary memory buffer. In order to encrypt the BLOB data, the storage interface retrieves the primary encryption key 210 from the primary key store. The storage interface generates a second encryption key in the form of an Initialization Vector (IV) 211, which it uses to randomize block data of the BLOB, prior to encoding it using a block cipher algorithm that relies on the primary encryption key. After encrypting the BLOB 212, the storage interface creates a hash value for the encrypted BLOB 213. The hash value can be computed using the well-known MD5 hash function or any other hash function.

Distinct storage threads are created 220 for each available storage platform, and the encrypted BLOB is passed to each of the threads for it to be written on the respective storage platforms. The storage platform monitors time from the launching of the threads until it receives a first successful termination signal from one of the threads. Based on the first thread completion time, a timeout delay is computed for the remaining threads as being 1.5 times the first thread completion time. In further embodiments, the timeout delay is between 1.5 and 2 times the first thread completion time. In yet further embodiments, the timeout delay is set in dependence on characteristics of the target storage platform. In particular, longer timeout delay are used for storage platforms having shown slower seek and or/or access times.

After the timeout delay has elapsed, the storage interface checks 221 whether all the remaining storage threads have completed successfully. For each thread that has not completed successfully within the timeout delay, a corresponding entry is made in a Control Log database 222, which is kept by the storage interface. Entries in the Control Log database are used for rescheduling the corresponding write operations on the corresponding storage platforms later on using new storage threads.

If none of the storage threads terminates successfully within a fixed timespan as defined by the Operating System for http or CIFS requests or by a custom interface for proprietary requests, a corresponding error message is returned to the requesting SharePoint system.

If at least one of the storage threads terminates successfully, the storage interface proceeds as follows. Using information including the IV, the computed hash value and information about the storage location, the storage interface creates an access token 240 for the encrypted and stored BLOB, which is returned to the requesting SharePoint system 241.

The SharePoint system stores the access token for the BLOB in a dedicated SQL database and notifies the requesting application/user of the success of the write request.

Figure 6:
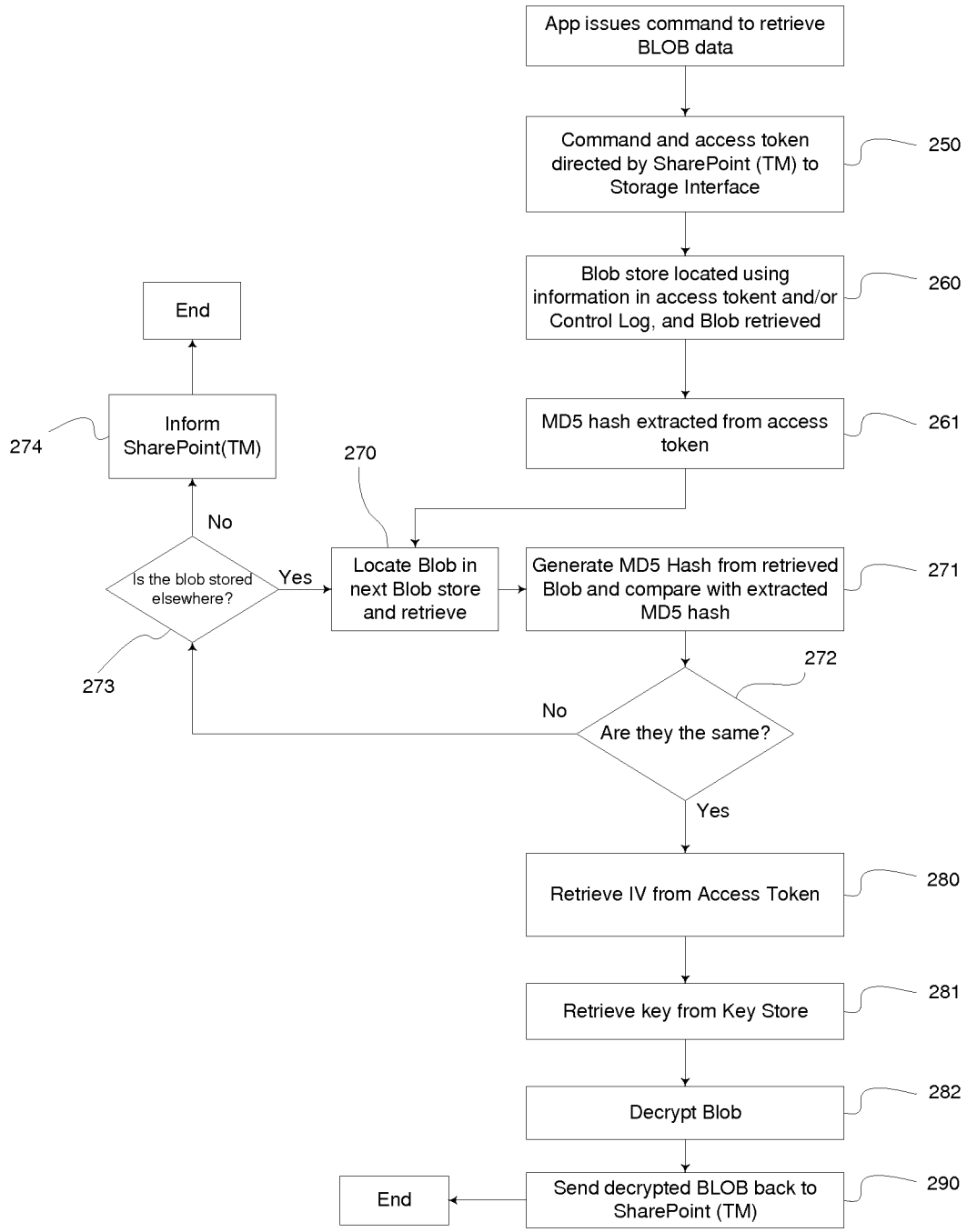
FIG. 6 is a flow diagram illustrating steps according to an embodiment of the present invention.

When a client application requests to retrieve previously stored BLOB data, the SharePoint system directs the request to a storage interface according to a preferred embodiment of the present invention. In its request, it includes the access token for the BLOB, which it retrieves from a dedicated SQL database. The method steps that follow are illustrated in FIG. 6.

The storage interface is configured for reading from at least two storage platforms that may be collocated with the storage interface or may be physically remote. Upon reception of the read request from the SharePoint system 250, the storage interface extracts the storage information for the encrypted BLOB, as well as the hash value for the encrypted BLOB 260 from the received access token and from the Control Log. The storage interface tries to locate 270 the encrypted BLOB on one of the available storage platforms. In a preferred embodiment, the storage interface first attempts to retrieve the data from the locations listed in the access token, and is then followed by those in the Control Log. Alternatively, other access policies may be enforced by the storage interface. For example, an optimized access policy results from ranking the storage platforms according to increasing latency and/or the likelihood of data having been successfully stored to decide whether it is worthwhile checking the Control Log entries prior to the access token entries. The storage platforms are then accessed following their ranking order.

Once the first storage location returns the requested data, the process is interrupted as only one copy of the incoming data is necessary. If the storage interface fails to locate the encrypted BLOB 273, a corresponding message is sent to the SharePoint system 274.

If the storage interface locates the encrypted BLOB 271, it retrieves the data and stores it into a temporary memory buffer. It computes a hash value for the located encrypted BLOB. The computed hash value is compared to the hash value that has been retrieved from the access token. If both hash values correspond, the correct encrypted BLOB has been located, otherwise the storage interface continues to look for the requested BLOB on the remaining storage platforms.

Once the encrypted BLOB has been successfully retrieved and confirmed for consistency, the IV is extracted from the access token 280. The storage interface gets the primary encryption key from the primary key store 281. Using the block cipher, the IV and the primary encryption key, the BLOB is deciphered by the storage interface 282. After decoding successfully, the deciphered BLOB data is returned to the SharePoint system 290, which forwards it to the requesting application.

It should be understood that the detailed description of specific preferred embodiments is given by way of illustration only, since various changes and modifications within the scope of the invention will be apparent to the skilled man. The scope of protection is defined by the following set of claims.

The invention claimed is:

1. A method for storing binary data to at least two data stores, the method comprising the steps of:
   at a storage interface, receiving, from a collaboration system, a store request and binary data that is to be stored;
   at a storage interface, creating a first processing thread and a second processing thread;
   at a storage interface, configuring the first processing thread for writing a backup of said binary data to a first data store;
   at a storage interface, configuring the second processing thread for writing a backup of said binary data to a second data store separate from the first data store;
   at a storage interface, concurrently executing the first processing thread and the second processing thread;
   at a storage interface, checking for successful termination of said processing threads after a timeout delay;
   at a storage interface, for each thread that has not successfully terminated after said timeout delay, creating an entry in a Control Log; and
   at a storage interface, creating an access token for said binary data, and sending said access token to said collaboration system.

2. The method according to claim 1, wherein said timeout delay for said processing threads is computed as a factor of a running time of a first successfully terminating thread.

3. The method according to claim 1, wherein the Control Log is a database.

4. The method according to claim 1, wherein the method further comprises the step of computing a hash value for the binary data and wherein said access token comprises said hash value.

5. The method according to claim 1, wherein said Control Log entry comprises information on a data store in which the binary data was not successfully written.

6. The method according to claim 5, wherein the method further comprises the steps of:
   creating a processing thread for each Control Log entry that indicates an unsuccessful storage operation of said binary data to a data store;
   configuring each created processing thread for storing said binary data in one of said data stores; and
   in case one of said processing threads succeeds in storing said binary data in said data store, updating the corresponding Control Log entry by providing the new storage location for said binary data.

7. The method according to claim 1, wherein the method further comprises the steps of:
- at a storage interface, providing a first encryption key;
- at a storage interface, generating a second encryption key;
- at a storage interface, encrypting said binary data using said first and second encryption keys and an encryption algorithm;
- at a storage interface, storing said encrypted binary data in at least one data store; and
- at a storage interface, creating an access token to said stored binary data, including said second encryption key and returning it to said collaboration system.

8. The method according to claim 7, wherein the method further comprises the step of computing a hash value for said binary data, and wherein said access token comprises said hash value.

9. The method according to claim 7, wherein the encryption algorithm is a block cipher and the second encryption key is an Initialization Vector that is generated by the storage interface and used to randomize the binary data prior to encryption.

10. The method according to claim 9, wherein said access token comprises said Initialization Vector.

11. The method according to claim 1, wherein said collaboration system is a Microsoft SharePoint™ collaboration system.

12. The method according to claim 1, wherein the binary data is a Binary Large Object (BLOB).

13. A device comprising a processor and memory, the memory being configured with stored instructions that, in response to being processed by the processor, cause the device to carry out the method according to claim 1.

* * * * *